United States Patent [19]

Faulk

[11] 4,304,500
[45] Dec. 8, 1981

[54] RETAINER FOR IMPACT TOOL COUPLINGS

[75] Inventor: Ashton J. Faulk, Groves, Tex.

[73] Assignee: Texaco Inc., White Plains, N.Y.

[21] Appl. No.: 141,519

[22] Filed: Apr. 18, 1980

[51] Int. Cl.³ .............................................. B25G 3/26
[52] U.S. Cl. ................................. 403/324; 403/379
[58] Field of Search .................... 403/108, 324, 379; 279/1 C, 97, 86

[56] References Cited

U.S. PATENT DOCUMENTS

| | | | |
|---|---|---|---|
| 2,304,038 | 12/1942 | Thompson | 403/324 |
| 3,446,523 | 5/1969 | Little | 403/108 |
| 3,549,160 | 12/1970 | Etzkorn | 403/379 X |
| 4,135,835 | 1/1979 | Kitchen et al. | 403/108 |

*Primary Examiner*—Andrew V. Kundrat
*Attorney, Agent, or Firm*—Carl G. Ries; Robert A. Kulason; H. C. Dearborn

[57] ABSTRACT

A retainer especially for use with impact tools that have a drive shaft adapted to removably receive a tool socket. The socket and shaft have a diametric hole that is in alignment when the tool is attached in driving relationship to the shaft. The retainer has a pin that is adapted for extending through the hole, and there is an integral flexible ring with the pin situated diametrically across it and attached to it at one end.

2 Claims, 3 Drawing Figures

RETAINER FOR IMPACT TOOL COUPLINGS

BACKGROUND OF THE INVENTION

1. Field of the Invention

This invention concerns tool retainers in general. More specifically, it deals with an improved retainer for use especially with impact tools having removable coupling for different size tools, and the like.

2. Description of the Prior Art

Heretofore the coupling employed for fastening sockets to a square-shaft-drive impact wrench has made use of a cross pin, with an O-ring surrounding the socket to retain the pin in place. Such structure employed a metal pin and, particularly with heavy duty impact wrench structures, there was a dangerous tendency for the pin to come loose from underneath the O-ring and slip out so that an injury often resulted. The situation was aggravated where the pin employed was undersized for the cross hole of the coupling.

Consequently, it is an object of this invention to provide a superior retainer structure for impact tools. It has an integral cross pin and ring for holding the pin in place.

SUMMARY OF THE INVENTION

Briefly, the invention concerns a retainer for use with a removable drive shaft coupling for impact driven tools and the like. The coupling includes non-circular cross-section socket and shaft, with one on each of said drive shaft and said tool. The coupling also has a diametric hole through said socket and shaft in order to receive a pin to hold them in driving relationship and against longitudinal disengagement. The said retainer comprises a pin adapted for extending through said diametric hole, and integral means for holding said pin against radial movement to guard against inadvertent removal thereof.

Again briefly, the invention concerns a retainer for use with a removable drive shaft coupling for impact driven tools and the like. Such coupling includes a polygonal cross section socket and shaft, one on each of said drive shaft and said tool. It also includes a diametric hole through said socket and shaft in order to receive a pin to hold them in driving relationship and against longitudinal disengagement. The said retainer comprises a resilient neoprene pin adapted for extending through said diametric hole, and a round cross-sectional shaped neoprene ring molded into said pin at one end thereof. The said pin extends diametrically across said ring, and said round ring is adapted for being retained in a groove outside of said socket and in the plane of said diametric hole.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

Figure 1:
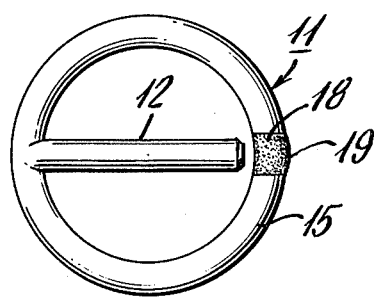
FIG. 1 is a plan view of a retainer unit according to the invention.

In refinery operations and the like, it is common to employ impact type tools, particularly wrenches, which have changeable size tools that are removably attached to the square shaft of the impact tools' drive. The tool was held in place on the drive shaft by means of a metal pin through a cross hole in the square shaft and the tool socket. There was also an O-ring placed over the socket to cover the ends of the pin for holding it in place. It was found that numerous facial and hand injuries were occasioned by the use of tools with this coupling, because the metal pin would slip out from behind the O-ring and fly out under considerable force. As will appear hereafter, the advantage of this invention is not only that of holding the pin from coming out of the hole. But, because the construction of the pin is of low mass material, even if it should break under usage, there will be no highly damaging force from the pin should it fly out. In addition, because of the nature of a retainer according to this invention, the size must be designed to fit a particular tool. Consequently, there is no possibility of using an undersized pin, which would aggravate the tendency for malfunction and injury.

Referring to the drawings, it will be observed that a retainer 11 is made up of a diametrically situated pin 12 that is molded into a ring 15, at one end of the pin 12. Also, there may be a colored band 18 located on the ring 15 opposite the other (unattached) end of the pin 12, for aiding in removal of the unit. Likewise, the ring 15 may include a tab 19 which protrudes slightly from the ring 15 as part of the colored band 18.

Figure 2:
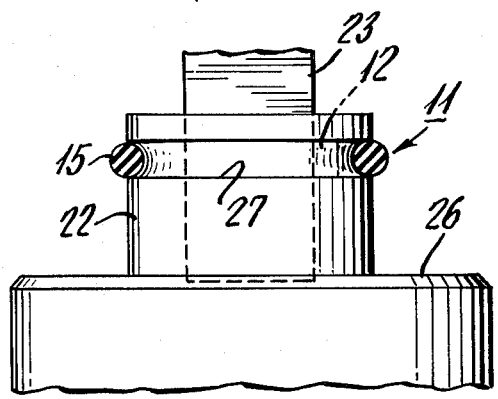
FIG. 2 is an elevation showing a drive shaft and tool socket in coupled relationship, with the retainer in cross-section thereon.
Figure 3:
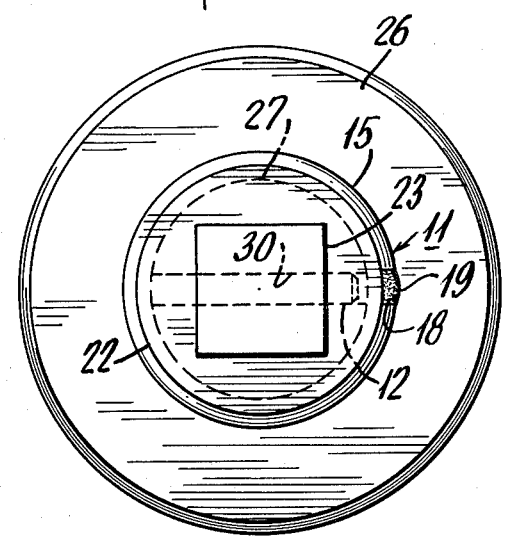
FIG. 3 is a top plan view of the elements illustrated in FIG. 2.

FIGS. 2 and 3 illustrate a retainer unit 11 in place with a tool socket 22 in driving relationship over a square shaft 23 of an impact drive. The socket 22 is carried by a tool 26, which may be a wrench or the like.

It will be understood that the coupling arrangement between an impact drive and the tool that is coupled thereto, might be reversed, i.e. the square shaft 23 might be connected to a tool while the tool 26 might be the driving output from an impact drive having the socket 22 thereon. However, the more usual arrangement is for an impact drive to end with a square shaft such as shaft 23. And, the wrench (tool 26) being driven is removable for applying different size wrenches thereto.

It will be noted that there is a groove 27 on the socket 22 of the tool 26. This groove is in the same plane as a diametrically located hole 30 that extends through both the shaft 23 and the socket 22. Both parts of the hole 30 are in alignment when the socket 22 is in place for driving relationship with the shaft 23.

It will be understood that in order to apply a retainer unit 11 after the tool 26 has been placed onto the end of the shaft 23, the unit 11 will first have been slipped over either the shaft 23 or the socket 22 of the tool 26. Then after both parts of the hole 30 are in alignment through the shaft 23 and the socket 22, the ring 15 will be stretched enough to permit the free end of the pin 12 to be inserted into and pushed through the length of the hole 30. Thus, by having first placed the ring 15 around the socket 22 or the shaft 23 with the pin 12 being flexed to one side, the unit 11 will be in place so that the ring 15 may be stretched for inserting the pin 12 through the hole 30. Then the ring 15 may be released into holding engagement in the groove 27.

While a particular embodiment of the invention has been described above in considerable detail in accordance with the applicable statutes, this is not to be taken as in any way limiting the invention, but merely as being descriptive thereof.

I claim:

1. Retainer for use with a removable drive shaft coupling for impact driven tools and the like, wherein said coupling includes non-circular cross section socket and shaft, one on each of said drive shaft and said tool, and a diametric hole through both said socket and said shaft to receive a pin to hold them in driving relationship against longitudinal disengagement, said retainer comprising
   a resilient material pin adapted for extending substantially all the way through said diametric hole,
   an elastic ring having a round cross sectional shape for being retained in a groove on said socket,
   said pin being integrally molded at one end into said ring and extending diametrically across thereof, and
   indicator means on said ring opposite and adjacent the other and free end of said pin for aiding in removal of said retainer.

2. Retainer according to claim 1, wherein said pin and ring are constructed of neoprene.

* * * * *